United States Patent [19]

Foster

[11] Patent Number: 4,817,783

[45] Date of Patent: Apr. 4, 1989

[54] SINGLE PISTON ROD HYDRAULIC DRIVE

[76] Inventor: Raymond K. Foster, P.O. Box 1, Madras, Oreg. 97741

[21] Appl. No.: 189,540

[22] Filed: May 3, 1988

[51] Int. Cl.⁴ ............................................. B65G 25/00
[52] U.S. Cl. .................................. 198/750; 414/525.9; 91/189 R
[58] Field of Search .............................. 198/750, 775; 414/525 B, 525 R; 92/117 A, 151; 91/176, 185, 189 R, 419

[56] References Cited

U.S. PATENT DOCUMENTS

| | | | |
|---|---|---|---|
| 4,143,760 | 3/1979 | Hallstrom | 198/750 |
| 4,526,086 | 7/1985 | Holton et al. | 91/176 X |
| 4,748,894 | 6/1988 | Foster | 92/151 X |

Primary Examiner—Frank E. Werner
Assistant Examiner—D. Glenn Dayoan
Attorney, Agent, or Firm—Delbert J. Barnard

[57] ABSTRACT

A single elongated piston rod (12) is secured by a ball and socket joint (62, 66, 68) at one end to a frame member (82). At its opposite end it is restrained against up and down and sideways movement but is not connected. A plurality of piston heads (22, 24, 26) are spaced apart along the length of the piston rod (12). A traveling cylinder (28, 30, 32) is associated with each piston head (22, 24, 26), a transverse drive beam (16, 18, 20) is connected to each traveling cylinder (28, 30, 32). Each transverse drive beam (16, 18, 20) is connected to a separate group ("1", ¢2", "3") of the floor members (14) which make the reciprocating floor conveyor.

10 Claims, 2 Drawing Sheets

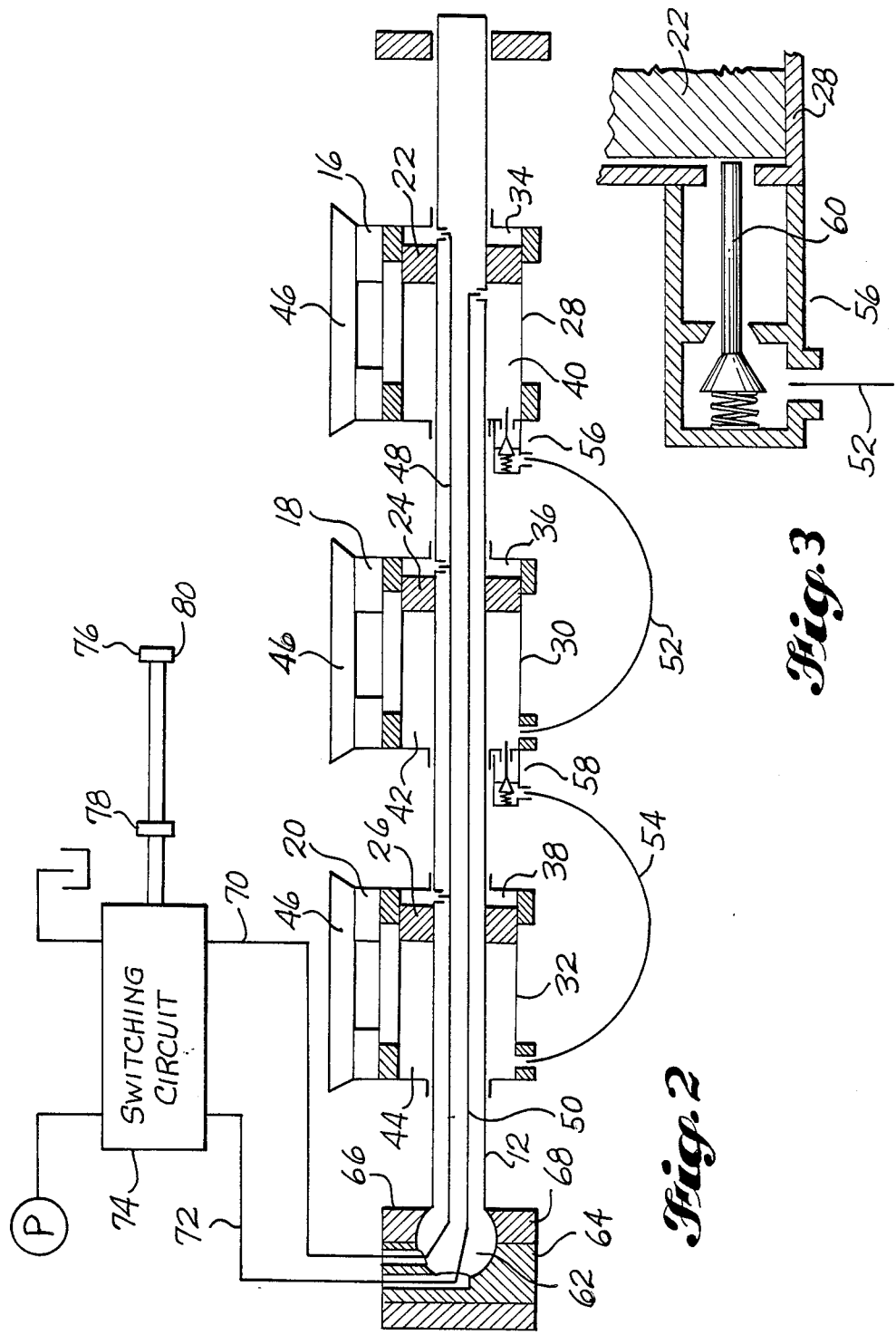

4,817,783

SINGLE PISTON ROD HYDRAULIC DRIVE

DESCRIPTION

1. Technical Field This invention relates to reciprocating floor conveyors. More particularly, it relates to the provision of a simplified hydraulic drive assembly for advancing and retracting the floor members of a reciprocating floor conveyor.

2. Background Art

Basically considered, a reciprocating floor conveyor comprises at least one group of at least three elongated floor members in a hydraulic drive system which operates to drive at least a majority of the floor members in unison in the desired conveying direction, and to retract them individually. Systems are in use in which all of the floor members are driven in unison, in the desired conveying direction, and are then individually retracted sequentially. It has also been proposed to drive a majority of the floor members in the desired conveying direction while at the same time retracting the remaining floor slat members. The present invention has application for both types of systems.

For background purposes, reference is made to U.S. Pat. No. 4,143,760, granted Mar. 13, 1979, to Olaf A. Hallstrom. Reference is also made to my copending application Ser. No. 477,767, filed Dec. 11, 1984, now abandoned and entitled Reduced Size Drive/Frame Assembly for Reciprocating Floor Conveyor. Application Ser. No. 477,767 discloses and claims a simplified hydraulic drive which comprises a plurality of parallel hydraulic units, each having a fixed piston rod and a traveling cylinder. The traveling cylinder and a piston head on the piston rod together define a pair of fluid chambers, one on each side of the piston head. Each traveling cylinder is connected to a transverse drive beam. Each transverse drive beam is connected to one set of floor members.

A principal object of the present invention is to provide a hydraulic drive for a plurality of transverse drive beams which is further simplified and is further reduced in size. The weight savings it provides results in a greater payload for the vehicle in which the hydraulic drive is installed.

DISCLOSURE OF THE INVENTION

A hydraulic drive unit according to the present invention is basically characterized by an elongated piston rod which in use extends parallel to the floor slat members of a reciprocating floor conveyor, and perpendicular to the transverse drive beams of the conveyor, at a location offset below the transverse drive beams. A plurality of piston heads, one for each transverse drive beam, are spaced apart along the piston rod and are fixed in position on the piston rod. A traveling cylinder is provided for each piston head. Each cylinder is mounted to reciprocate back and forth on the piston rod relative to its piston head. Each cylinder and its piston head together define two variable volume chambers, one axially outwardly from each end of the piston head. The piston heads and cylinders are positioned to place each cylinder closely below a related one of the transverse drive beams. Each cylinder is firmly connected to its transverse drive beam. In use, the transverse drive beams are moved by the cylinders back and forth along the piston rod.

The variable volume chambers endwise in one direction from the piston heads are hereinafter sometimes termed the first chambers and the variable volume chambers endwise of the piston heads in the opposite direction are hereinafter referred to as the second chambers. According to an aspect of the invention, the first chambers are connected in parallel to a first hydraulic line which leads to a switching circuit. The second chambers are connected together in series and an end chamber of the group is connected to a second hydraulic line which extends to the switching circuit. A check valve is located in each conduit leg which extends between adjacent second chambers. The check valves are biased so that when the second hydraulic line becomes a pressure line, the hydraulic fluid will flow first into the second chamber of the end cylinder that is directly connected to the second hydraulic line, and then from such second chamber to the second chamber of the next cylinder in line, and then from the second chamber of that cylinder to the second chamber of the next cylinder in line, etc. The check valves are also positioned so that when the second hydraulic line becomes a return line, the second chambers will discharge one at a time into the second hydraulic line. The second chamber of the first cylinder will discharge and the first cylinder will move relative to its piston head. Then an operator portion of the check valve will contact the piston head and be depressed by the contact, opening the check valve and communicating the second chamber of the second cylinder with the second chamber of the first cylinder. This will result in hydraulic fluid flowing out of the second chamber for the second cylinder into the second chamber for the first cylinder and then into the second hydraulic line. The second cylinder will move as its second chamber discharges hydraulic fluid. At the end of its movement an operator portion of its check valve will contact the piston head of the second cylinder, causing such operator to be depressed and causing the check valve to open and allow hydraulic fluid to flow from the second chamber of the third cylinder into the second chamber of the second cylinder, then onto the second chamber of the first cylinder, and then to the second hydraulic line.

In preferred form, the first and second hydraulic lines are contained within the elongated piston rod. Preferably also, a swivel connection is provided at one end of the elongated piston rod and the first and second hydraulic lines extend outwardly from the elongated piston rod through the swivel connection.

Other objects, features and advantages of the invention will be hereinafter disclosed as a part of the description of the best mode of the invention.

BRIEF DESCRIPTION OF THE DRAWING

Like reference numerals are used to designate like parts throughout the several views of the drawing, and:

FIG. 2 is an enlarged scale longitudinal sectional view of the hydraulic drive unit, with the hydraulic circuit shown schematically; and FIG. 3 is an enlarged scale longitudinal sectional view of a check valve in an open position, opened by contact of its operation with a piston head.

BEST MODE FOR CARRYING OUT THE INVENTION

Figure 1:
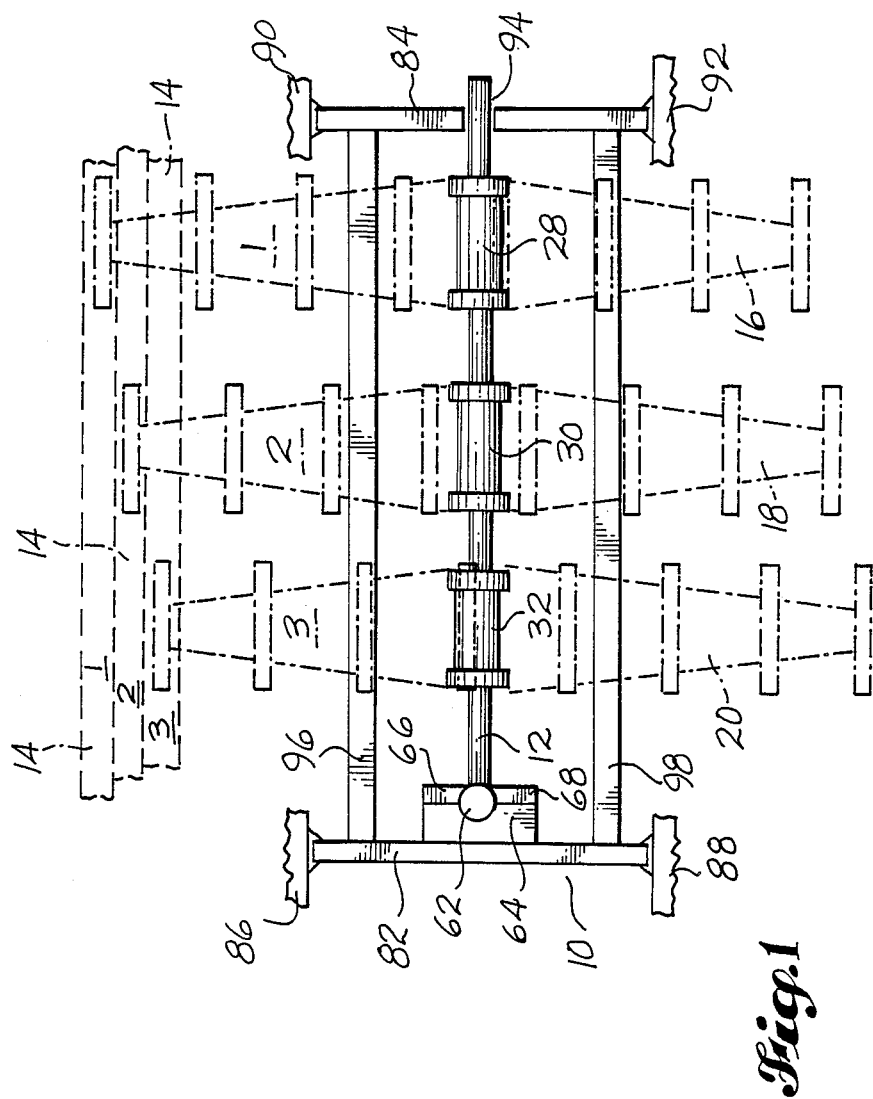
FIG. 1 is a top plan view of a hydraulic drive unit constructed according to the present invention, showing the piston cylinder assembly and a typical supporting frame in solid lines, such view also presenting a phantom line showing of the transverse drive beams, a group of the floor members, and connector members on the transverse drive beams which serve to connect the floor members to the transverse drive beams.

Referring to FIGS. 1 and 2, the hydraulic drive unit 10 that is illustrated comprises a single elongated piston rod 12 which extends parallel to the floor slat members 14 and perpendicular to the transverse drive beams 16, 18, 20. As best shown by FIG. 2, in use the piston rod 12 is positioned at a location that is offset below the transverse drive beams 16, 18, 20. A piston head for each transverse drive beam 16, 18, 20 is positioned on the piston rod 12. In the illustrated example, there are three groups of floor members and hence three transverse drive beams 16, 18, 20. Accordingly, there are three piston heads 22, 24, 26. The piston heads 22, 24, 26 are spaced apart axially along the piston rod 12 and are fixed in position on the piston rod 12.

A cylinder is provided for each piston head 22, 24, 26. Hence, there are three cylinders 28, 30, 32. Each cylinder 28, 30, 32 is mounted to reciprocate back and forth on the piston rod 12 relative to its piston head 22, 24, 26. Each cylinder 28, 30, 32 and its piston head 22, 24, 26 together define two variable volume chambers, one axially endwise from each end of the piston head 22, 24, 26. Herein, the variable volume chambers on the right side of the piston heads 22, 24, 26, as shown in FIG. 2, are referred to as the first chambers The variable volume chambers 40, 42, 44 which in FIG. 2 are on the left side of the piston heads 22, 24, 26 are referred to as the second chambers.

Each cylinder 28, 30, 32 is connected to an associated drive beam 16, 18, 20. In the illustrated embodiment, cylinder 28 is connected to drive beam 16. Cylinder 30 is connected to the drive beam 18. Cylinder 32 is connected to the drive beam 32. The manner of connection may be accomplished in any suitable manner. For example, clamps of the types disclosed in my copending application Ser. No. 477,767 may be used.

Each transverse drive beam 16, 18, 20 includes connectors 46 which extend parallel to the floor members 14, and to which the floor members 14 are attached, in a known manner. FIG. 1 shows three floor members 14 of a set. The floor member 14 marked with the numeral "1" is connected to drive beam 16. The floor member 14 marked with the numeral "2" is connected to drive beam 18. The floor member 14 marked "3" is connected to drive beam 20. This pattern of connection of floor members is repeated laterally across the full width of the floor. Movement of cylinder 28 causes a movement of drive beam 16 and the number "1" floor members 14 attached to it. Movement of cylinder 30 moves drive beam 18 and the number "2" floor members 14 attached to it. Movement of cylinder 32 moves drive beam 20 and the number "3" floor members 14 attached to it. The sequence of operation is described in my copending application Ser. No. 477,767 and thus will not be repeated herein.

The hydraulic system comprises a first hydraulic line 48 and a second hydraulic line 50. The first chambers 34, 36, 38 are connected in parallel to hydraulic line 48. The second chambers 40, 42, 44 are connected together in series and chamber 40 of this group is connected to hydraulic line 50. Conduit leg 52 which interconnects chambers 40, 42 includes a check valve 56. In similar fashion, conduit leg 54 which interconnects chambers 42, 44 includes a check valve 58. The check valves 56, 58 are constructed to open when hydraulic line 50 is a pressure line. The pressure enters chamber 40, immediately opens check valve 56, and then via conduit 52 enters chambers 42, and then immediately opens check valve 58 and via conduit 54 enters chamber 44. As a result, all three cylinders move substantially simultaneously when hydraulic line 50 is a pressure line.

When hydraulic line 48 is the pressure line, and line 50 is a return line, the check valves will be biased closed by the pressure in chambers 42, 44. Chamber 40 is connected directly to line 50. As a result, it will discharge fluid into the return line 50, and cylinder 28 will move, as pressure fluid is entering chamber 34 via the hydraulic line 58. At the end of movement of cylinder 28 an operator 60 that is a part of the check valve 56 contacts the piston head 22. This causes a movement of the operator 60 to the left, as pictured in FIG. 3, and opens the check valve. Thereafter, pressure fluid in chamber 42 is exhausted via conduit 52, the passageways in check valve 56, chamber 40, and hydraulic line 50. At the same time, cylinder 30 moves to the right in response to pressure fluid entering chamber 36. When the cylinder 30 reaches its end position, a similar operator 60 in check valve 58 makes contact with piston head 24. This opens the check valve 58 and allows pressure fluid within chamber 44 to be put in communication with the return line 50 via conduit 54, the passageways in check valve 58, conduit 52, the passageways in check valve 56 and chamber 40. Conduit legs 52, 54 may be flexible hydraulic hoses of sufficient length to permit the necessary relative movement of the cylinders.

In preferred form, the hydraulic lines 48, 50 are built into the piston rod 12. Preferably also, piston rod 12 is provided with a ball end 62 and such ball end 62 is clamped within a socket mount composed of members 64, 66, 68. The ball and socket joint thus formed allows some pivotal movement. Fluid passageways are provided in member 64 for delivering fluid pressure to and returning fluid pressure from the hydraulic lines 48, 50. Hydraulic line 70 is a continuation of hydraulic line 48. Hydraulic line 72 is a continuation of hydraulic line 50. Lines 70, 72 are connected to a switching circuit 74. Switching circuit 74 is of known construction (see for example my U.S. Pat. No. 4,580,678 granted Apr. 8, 1986, and entitled Reciprocating Floor Conveyor System). It includes an operator rod 76 that is provided with a pair of stops 78, 80. The operator 76 is positioned adjacent one of the drive beams 16, 18, 20. Shortly before the drive beam reaches the end of its path of travel in a first direction, it contacts member 78 and in so doing operates the switching circuit. Shortly before the same drive beam reaches the end of its travel in the opposite direction it contacts member 80 and in so doing again operates the switching circuit. Each operation of the switching circuit changes the character of the hydraulic line 70, 72. For example, if hydraulic line 70 is a pressure line and a hydraulic line 72 is a return line, an operation of the switching circuit will make hydraulic line 72 the pressure line and hydraulic line 70 the return line.

It is to be understood that the essential features of the invention are a single elongated piston rod and a plurality of piston heads and traveling cylinders on the rod which are equal in number to the number of floor members in a group. In the illustrated example there are three floor members per group, respectively identified by the numbers "1", "2", and "3". In another installation there may be "4", "5" or "6" members per group, for example. It is also to be understood that the other features may vary and in particular the construction and arrangement of the check valves may vary. For example, the check valves may be built into end members of the cylinders, as is illustrated in my copending application Ser. No. 477,767. The incorporation of the hydraulic lines 48, 50 inside the piston rod 12 may be accomplished in a number of ways. For example, the piston rod 12 may have a basic tubular structure and hydraulic lines 48, 50 may be small diameter conduits which are positioned within the hollow interior of the piston rod 12. Or, the piston rod 12 may be a solid member and hydraulic lines 48, 50 may be passageways which are drilled in the member 12. The ball portion of the ball and socket joint may be a separate member that is welded to the end of the elongated piston rod 12. The rod 12 may be constructed in sections to facilitate its manufacture and the manufacture and installation of the fluid lines 48, 50.

The support of the piston rod 12 may be accomplished in several ways. By way of example, a short transverse mounting beam 82, 84 may be provided at each end of the piston rod 12. The location of the cylinders 28, 30, 32 in a single line, makes it possible to substantially reduce the length of the frame members 82, 84 in comparison with any other known hydraulic drive unit for a reciprocating floor conveyor. In FIG. 1 the frame members 82, 84 are shown connected at their ends to frame members 86, 88, 90, 92 which are frame portions of the installation in which the hydraulic unit is incorporated. Preferably, the end of piston rod 12 opposite the ball connection 62 is restrained but not firmly connected to anything. For example, it might merely consist of a straight portion which fits into an opening 94 that is formed in frame member 84. The use of a ball and socket joint at a first end of the piston rod 12 and the positioning of the opposite end portion within an opening at a floor within frame member 84 allows the piston rod 12 to flex in response to some of the forces that are imposed upon it.

End frame members 82, 84 may be connected together by longitudinal frame members 96, 98 The upper surfaces of frame members 96, 98 may carry strips of a bearing material (e.g. self-lubricating plastic) on which the drive beams 16, 18, 20 slide. This arrangement is disclosed in my pending application Ser. No. 477,767.

From the forgoing, various further modifications, components arrangements, and modes of utilization of the reciprocating floor conveyor of the invention will be apparent to those skilled in the art to which the invention is addressed, within the scope of the following claims.

What is claimed is:

1. For use with a reciprocating floor type conveyor having at least three sets of floor slat members which are mounted adjacent to each other for longitudinal reciprocation, and a plurality of transverse drive beams, one for each set of floor slat members, each transverse drive beam including means for connecting it to its set of floor slat members, a hydraulic drive unit for the transverse drive beams, comprising:

an elongated piston rod extending parallel to the floor slat members and perpendicular to the transverse drive beams, at a location offset below the transverse drive beams, a plurality of piston heads, one for each transverse drive beam, spaced apart along the piston rod and fixed in position on the piston rod, a cylinder for each piston head, each said cylinder being mounted to reciprocate back and forth on said piston rod relative to its piston head, each said cylinder and its piston head together defining first and second variable volume chambers, one axially endwise from each end of the piston head, said piston heads and cylinders being positioned to place each cylinder at least closely below a related one of the transverse drive beams, means for connecting each cylinder to its transverse drive beam; and wherein in use the transverse drive beams are moved by said cylinders back and forth along the piston rod.

2. A hydraulic drive unit according to claim 1, wherein the first variable volume chamber of each cylinder is connected in parallel with a first hydraulic line, wherein a second hydraulic line is directly connected to the second chamber of a first cylinder, wherein a flexible conduit extends from the second chamber of said end cylinder to the second chamber of the next or second cylinder, wherein a second flexible conduit extends from the second chamber of the second cylinder to the second chamber of the next or third cylinder, wherein a first check valve is located in series between the first flexible conduit and the second chamber of the first cylinder, wherein a second check valve is located in series between the second flexible conduit and the second chamber of the second cylinder, wherein the first check valve is constructed to open in response to pressure in the second chamber of the first cylinder, and the second check valve is constructed to open in response to pressure in the second chamber of the second cylinder, wherein said first check valve includes means responsive to movement of the first cylinder, caused by fluid pressure introduction into its first chamber and exhausting of fluid pressure out from its second chamber, to an end position, for opening the first check valve and allowing fluid pressure to flow from the second chamber of the second cylinder, through the first check valve, then through the second chamber of the first cylinder to the second hydraulic line, and wherein said second check valve includes means responsive to movement of the second cylinder, caused by pressure fluid introduction into its first chamber and fluid exhausting out from its second chamber, to an end position, for opening the second check valve and allowing fluid in the second chamber of the third cylinder to flow through the second conduit, then through the second check valve, then through the first conduit, then through the first check valve, then through the second chamber of the first cylinder, onto the second hydraulic line.

3. A hydraulic drive unit according to claim 2, wherein the first and second conduits are flexible hoses of sufficient length to allow for the necessary movement of the hydraulic cylinders during movement of the cylinders.

4. A hydraulic drive unit according to claim 2, wherein the first and second hydraulic lines are located inside of the elongated piston rod.

5. A hydraulic drive unit according to claim 4, wherein the elongated piston rod has a mounting ball at one end and the first and second hydraulic lines extend through said mounting ball.

6. A hydraulic drive unit according to claim 5, further comprising a mounting socket for said ball, said ball and socket providing a pivot joint at the ball end of the piston rod.

7. A hydraulic drive unit according to claim 6, comprising frame means at the end of the piston rod opposite the ball for restraining movement of the piston rod sideways and up and down, but permitting endwise movement of the piston rod.

8. A hydraulic drive unit according to claim 1, comprising a transverse frame member at each end of the piston rod, and a pair of longitudinal frame members, one on each side of the piston rod, rigidly interconnected between the end frame members, to form a frame structure, and means connecting at least one end of the piston rod to the frame structure.

9. A hydraulic drive unit according to claim 1, comprising a mounting frame for the elongated piston rod, said elongated piston rod including a ball member at one end, said mounting frame including socket means engaging said ball to provide a ball and socket joint which defines a pivotal connection at such end of the piston rod.

10. A hydraulic drive unit according to claim 9, comprising frame means at the opposite end of the piston rod for restraining sideways and up and down movement of the piston rod, but permitting endwise movement of the piston rod relative to the frame means.

* * * * *